United States Patent
Shimura

(10) Patent No.: US 7,253,784 B2
(45) Date of Patent: Aug. 7, 2007

(54) COMMUNICATION SYSTEM FOR TIRE

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/546,946

(22) PCT Filed: Mar. 24, 2004

(86) PCT No.: PCT/JP2004/004051

§ 371 (c)(1),
(2), (4) Date: Aug. 26, 2005

(87) PCT Pub. No.: WO2004/089658

PCT Pub. Date: Oct. 21, 2004

(65) Prior Publication Data

US 2006/0061462 A1     Mar. 23, 2006

(30) Foreign Application Priority Data

Apr. 2, 2003    (JP)    ............................. 2003-099248

(51) Int. Cl.
*H01Q 1/40*    (2006.01)
(52) U.S. Cl. ...................... 343/873; 343/711; 340/447
(58) Field of Classification Search ................ 343/711, 343/872, 873; 340/445, 447; 152/152.1
See application file for complete search history.

(56) References Cited

U.S. PATENT DOCUMENTS

| | | | |
|---|---|---|---|
| 3,895,347 A * | 7/1975 | Takusagawa et al. ....... | 340/447 |
| 4,067,235 A | 1/1978 | Markland | |
| 6,271,804 B1 * | 8/2001 | Yanagisawa et al. ....... | 343/895 |
| 6,463,799 B1 * | 10/2002 | Oldenettel et al. ......... | 73/146.5 |
| 6,774,777 B2 * | 8/2004 | Tsujita ........................ | 340/445 |
| 7,102,499 B2 * | 9/2006 | Myatt ......................... | 340/447 |

FOREIGN PATENT DOCUMENTS

| | | |
|---|---|---|
| JP | 52-040183 A | 3/1977 |
| JP | 02-074204 | 6/1990 |
| JP | 04-093388 A | 8/1992 |
| JP | 10-041730 A | 2/1998 |
| JP | 2000-031715 A | 1/2000 |
| JP | 2000-158923 A | 6/2000 |
| JP | 2001-056263 | 2/2001 |
| JP | 2002-164726 A | 6/2002 |
| JP | 2002-217624 A | 8/2002 |
| JP | 2002-324292 A | 11/2002 |
| JP | 2003-165313 A | 6/2003 |
| JP | 2004-181984 A | 7/2004 |

OTHER PUBLICATIONS

International Search Report, 2004.

* cited by examiner

*Primary Examiner*—Tan Ho
(74) *Attorney, Agent, or Firm*—Greer, Burns & Crain, Ltd.

(57) ABSTRACT

Disclosed is a communication system for a tire, whose receiving antenna is less likely to be damaged even in a case where the antenna is arranged near the tire. In this communication system, a motor vehicle is equipped with a receiver for receiving data from an electronic device installed in a wheel including a tire, and a receiving antenna connected to the receiver. The receiving antenna is covered with a flexible insulator to form an antenna insert body, and the antenna insert body is arranged within a range which allows the data to be accepted.

4 Claims, 2 Drawing Sheets

COMMUNICATION SYSTEM FOR TIRE

This application is a 371 of PCT/JP04/04051 filed on Mar. 24, 2004.

TECHNICAL FIELD

The present invention relates to a communication system for a tire for acquiring information concerning the inside of the tire, including an air pressure and a temperature. More specifically, the present invention relates to a communication system for a tire which is preferable for motor vehicles, including trucks and buses.

BACKGROUND ART

For the purpose of monitoring information concerning the inside of the tire, including the air pressure and the temperature, a conventional practice has been to install an electronic device including various sensors in a tire air chamber, and thus to cause a receiver outside the tire to receive data from the electronic device by use of radio waves (see Japanese patent application Kokai publication No. 2002-324292, for example).

In the case of vehicles including trucks and buses in particular, radio waves attenuate to a large extent due to influence of structure of the tire while the radio waves pass the tire. For this reason, a receiving antenna is installed in each of the wheel houses. For the purpose of protecting an antenna circuit, the receiving antenna is installed on the motor vehicle so as to be in a state of being contained in a rigid resin case.

However, if the receiving antenna contained in the rigid resin case is arranged near the tire, the resin case may be damaged due to a stone flown or the like in some cases. In addition, in a case where the resin case is covered with snow due to the motor vehicle's drive on a snowed road, radio waves can not be received. When the snow is intended to be wiped off, it is likely that the rigid resin case may be damaged. Then, if the resin case is damaged, it is likely that the receiving antenna and the antenna circuit, which are contained in the damaged resin case, may be destroyed.

DISCLOSURE OF THE INVENTION

An object of the present invention is to provide a communication system for a tire whose receiving antenna is hard to damage even in a case where the receiving antenna is arranged near the tire.

In the case of a communication system for a tire according to the present invention for the purpose of achieving the aforementioned object, a motor vehicle is equipped with a receiver for receiving data from an electronic device installed in a wheel with a tire, and a receiving antenna connected to the receiver. The communication system for a tire is characterized in that the receiving antenna is covered with a flexible insulator to form an antenna insert body, and in that the antenna insert body is arranged in a range which allows the data to be received.

In the case of the present invention, the antenna insert body in which the receiving antenna is covered with the flexible insulator is capable of changing shape. Accordingly, the receiving antenna will not be destroyed even in a case where a stone flown collides with the antenna insert body, or in a case where the antenna insert body is beaten with a bar or the like. This enables the receiving antenna to be prevented from being damaged for a long period of time even in a case where the receiving antenna is arranged near the tire. Incidentally, the antenna insert body is a component which is installed in the motor vehicle later. For this reason, in a case where the receiving antenna is damaged, it may be merely replaced with a new one.

The antenna insert body can be configured in a way that a reception orientation of the receiving antenna is not specified. In such a case, if the antenna insert body is arranged between a pair of adjacent wheel axles, it is possible for the data from a plurality of wheels mounted onto the two wheel axles to be received at a time. Accordingly, it is possible to reduce the number of the receiving antennae to be installed.

In order to enable the flexible insulator to change shape easily when a foreign object comes in contact with the flexible insulator, it is preferable that an elasticity coefficient of the flexible insulator be 1.0 MPa to 5,000 MPa. In addition, in order to avoid communication interruption which would otherwise occur due to snow covering the antenna insert body, it is preferable that the surface of the antenna insert body be treated with a water repellent coating.

The shape of the antenna insert body is not limited in particular. For example, in the case of a plate-shaped antenna insert body, the outer periphery of the plate-shaped antenna insert body may be partially attached in any one of a bottom part, a wheel house and a fender of the motor vehicle. In the case of a string-shaped antenna insert body, a part of the string-shaped antenna insert body may be attached in any one of the bottom part, the wheel house and the fender of the motor vehicle.

BEST MODES FOR CARRYING OUT THE INVENTION

Hereinafter, detailed descriptions will be provided for a configuration of the present invention with reference to the attached drawings.

Figure 1:
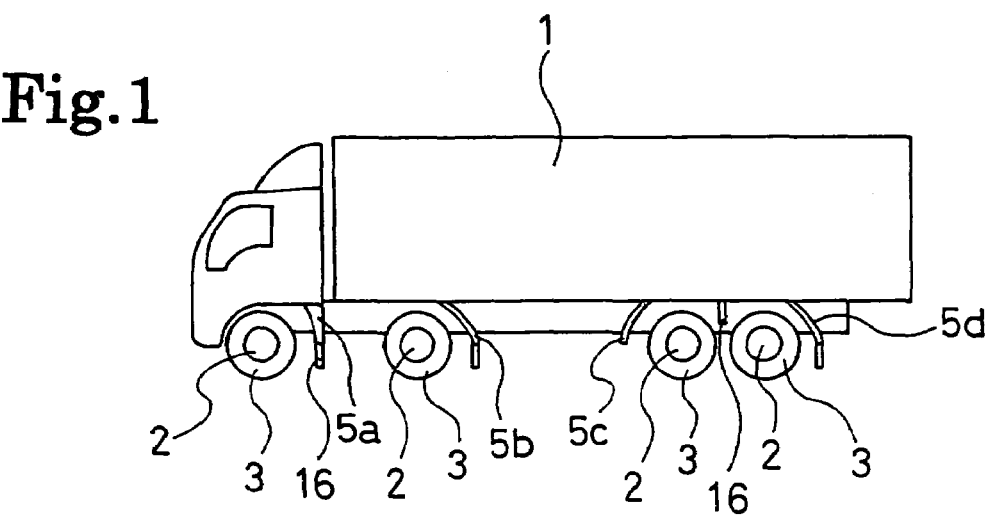
FIG. 1 is a side view showing an example of a motor vehicle equipped with a communication system for a tire according to the present invention.
Figure 2:
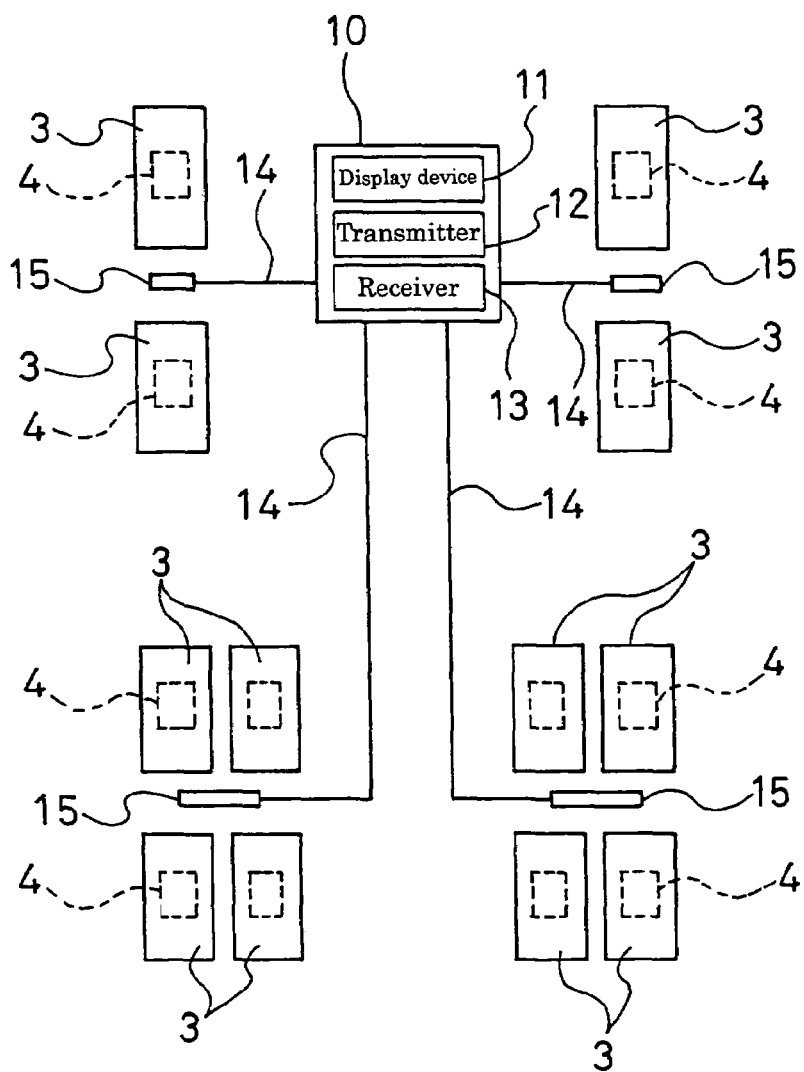
FIG. 2 is a schematic diagram showing the communication system for a tire according to the present invention.
Figure 3:
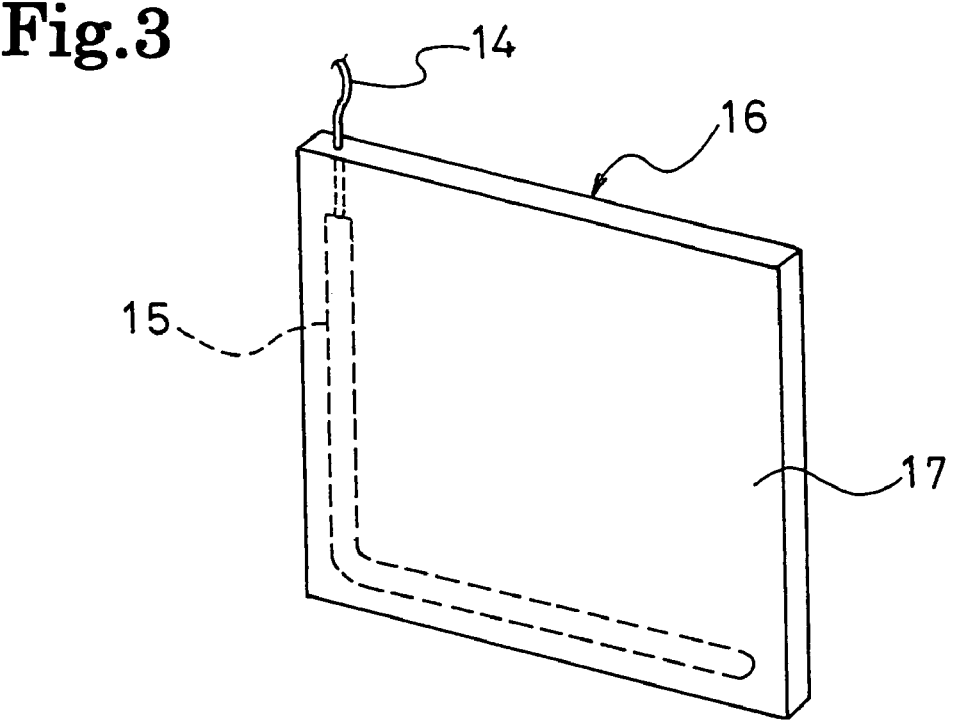
FIG. 3 is a perspective view showing an example of an antenna insert body according to the present invention.

FIG. 1 shows an example of a motor vehicle equipped with a communication system for a tire according to the present invention. FIG. 2 shows a schematic configuration of the communication system for a tire according to the present invention. FIG. 3 shows an example of the antenna insert body.

As shown in FIG. 1, a motor vehicle 1 is a truck including a plurality of wheels 2 in each of the two front axles and the two rear axles. Each of the wheels 2 is equipped with a tire 3. In addition, each of the wheels 2 is equipped with an electric device 4 for detecting information concerning the inside of the tire, including an air pressure and a temperature thereof (see FIG. 2). The electronic device 4 includes a pressure sensor, a temperature sensor, a transmitter, a receiver, a control circuit, a battery and the like. Among them, at least the sensors are installed within a tire air chamber.

Fenders 5a to 5d, which are made of a metal, are attached to surrounding areas respectively of the tires 3 in the motor vehicle 1. Wheel houses are formed respectively of these fenders 5a to 5d. In addition, flexible mud guards are annexed respectively to the fenders 5a to 5d depending on necessity.

As shown in FIG. 2, the motor vehicle 1 is equipped with an air pressure warning system 10. This air pressure warning system 10 includes a display device 11, a transmitter 12, and a receiver 13. The air pressure warning system 10 gathers data from the electronic devices 4 respectively via antennae 15 connected to the air pressure warning system 10 through wirings 14. On the basis of the data, the air pressure warning system 10 is designed to monitor the air pressures of all of the tires. In other words, the communication system for a tire is configured of the electronic devices 4, the transmitter 12, the receiver 13, the wirings 14 and the antennae 15.

Here, the antenna 15 is not installed in a range in which the data is accepted while the antenna 15 is in a state of being contained in the rigid resin case as in the conventional manner. Instead, as shown in FIG. 3, the antenna 15 which is processed into the antenna insert body 16 is set in the range in which the data is accepted. The antenna insert body 16 is what is formed through covering the antenna 15 with a flexible insulator 17. The antenna insert body 16 is processed so as to be shaped like a plate, in common with the mud guard. However, a shape of the antenna insert body 16 in plane is not limited in particular. The antenna insert body 16 can be processed so as to be shaped like a polygon or a circle. In addition, the antenna circuit attached to the antenna 15 may be embedded in the antenna insert body 16.

The antenna 15 is constituted of a conductive material including a metal. The antenna 15 has a structure with a preferable flexibility as in a coil or a foil so that the antenna 15 is sufficiently durable against repeated bending.

The surface of the antenna insert body 16 is treated with a water repellant process for the purpose of avoiding communication interruption which would otherwise occur due to snow covering the antenna insert body 16. As a method of performing such a water repellant process, for example, a film can be formed, of silicon resin or fluorine resin, on the surface of the antenna insert body 16.

For the purpose of enabling each of the insulator 17 to easily change shape in a case where a foreign object comes into contact with the insulator 17, an elasticity coefficient of the insulator 17 is set at a range of 1.0 MPa to 5,000 MPa. If this coefficient is less than 1.0 MPa, the insulator 17 has an insufficient durability, and thus the antenna 15 is easy to break. On the contrary, if the coefficient exceeded 5,000 MPa, the insulator 17 has an insufficient flexibility against collision of a flown stone and the like, and thus the corresponding antenna 15 is easy to break.

Resin and rubber can be used as a material for the insulator 17. Nylon, polyethylene, fluorine resin and the like can be listed as the resin. Ethylene-Propylene Rubber (EPDM), silicon rubber, fluorine rubber and the like can be listed as the rubber. In the case of the rubber, a composite between the rubber and a fiber such as a nylon fiber may be used. However, it is preferable that the composite be not compounded with carbon black as a reinforcement agent.

As shown in FIG. 1, the antenna insert body 16 can be attached, as a mud guard, to the fender 5a between the two front axles. In addition, the antenna insert body 16 can be attached to the inside of the tire case for the two rear axles by use of brackets or the like. Otherwise, the antenna insert body 16 can also be attached to the bottom part of the motor vehicle 1. Particularly in a case where the antenna insert body 16 constitutes the mud guard, the antenna 15 can be set with ease through simply replacing an existing mud guard with the antenna insert body 16.

The antenna insert body 16 thus set easily changes shape in a case where a stone flown by the tire 3 collides with the antenna insert body 16. This makes it hard for the stress concentration to occur. For this reason, the antenna 15 will not be destroyed. In addition, since the antenna insert body 16 is capable of changing shape, snow is hard to adhere to the antenna insert body 16. Even if snow were to adhere to the antenna insert body 16, the snow can be easily removed by beating the antenna insert body 16 with a bar, without destroying the antenna 15. For this reason, even in a case where the antenna 15 is arranged near the tire 3, the antenna 15 can be prevented from being damaged for a long period of time.

In addition, the antenna insert body 16 can make a reception and a transmission from the two sides without identifying a reception orientation of the antenna 15. For this reason, if the antenna insert body 16 is arranged between a pair of adjacent wheel axles, it is possible for the data from the plurality of wheels 2 mounted onto the two wheel axles to be received at a time. Accordingly, it is possible to reduce the number of the receiving antennae 15 to be installed.

With regard to hardness against bending of the antenna insert body 16 processed so as to be shaped like a plate in the aforementioned manner, it suffices if the antenna insert body 16 had a flexibility which allows the antenna insert body 16 to be flexed enough when the antenna insert body 16 is beaten with a bar or the like to which a human power is applied. If this hardness against bending were too large, the antenna insert body 16 has an insufficient flexibility when a stone flown or the like collides with the antenna insert body 16. Accordingly, the corresponding antenna 15 is easy to destroy.

Figure 4:
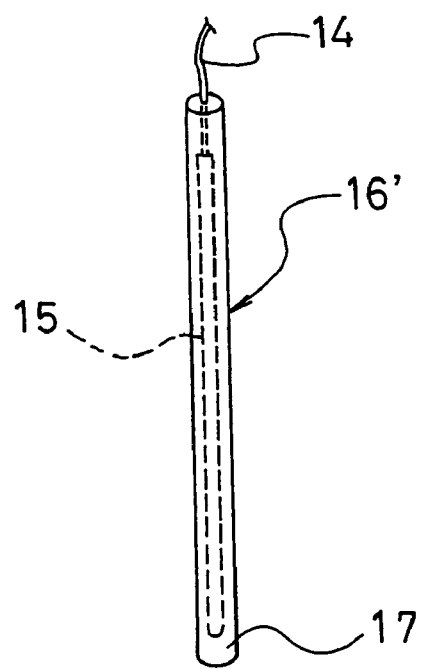
FIG. 4 is a perspective view showing a modification of the antenna insert body according to the present invention.

FIG. 4 shows a modification of the antenna insert body. In FIG. 4, the antenna insert body 16' is processed so as to be shaped like a string. In the case of the string-shaped antenna insert body 16', one end part or an intermediate part thereof may be attached to any one of the bottom part, the wheel house and the fender of the motor vehicle.

Detailed descriptions have been provided for the preferred embodiment. However, it should be understood that various changes, substitutions and replacements can be carried out as long as they do not depart from the spirit and the scope of the present invention defined in the attached claims.

INDUSTRIAL APPLICABILITY

The present invention can be utilized effectively in the tire manufacturing industry, and consequently in the car manufacturing industry.

What is claimed is:

1. A communication system for a tire, in which a motor vehicle is equipped with a receiver for receiving data from an electronic device installed in a wheel with the tire, and a receiving antenna connected to the receiver, characterized in that the receiving antenna is covered with a flexible insulator to form an antenna insert body, the antenna insert body is arranged in a range which allows the data to be received, and a surface of the antenna insert body is treated with a water repellent coating.

2. The communication system for a tire according to claim 1, characterized in that an elasticity coefficient of the flexible insulator is 1.0 MPa to 5,000 MPa.

3. The communication system for a tire according to claim 1, characterized in that the antenna insert body is shaped like a plate, and an outer periphery of the antenna insert body is partially attached in any one of a bottom part, a wheel house and a fender of the motor vehicle.

4. The communication system for a tire according to claim 1, characterized in that the antenna insert body is shaped like a string, and a part of the antenna insert body is attached in any one of the bottom part, the wheel house and the fender of the motor vehicle.

* * * * *